United States Patent
Pham et al.

(10) Patent No.: US 6,560,719 B1
(45) Date of Patent: May 6, 2003

(54) METHOD FOR RECOVERY OF ORIGINAL REGISTRY KEY FILE DATA

(75) Inventors: Thien Huu Pham, Garden Grove, CA (US); Philip Douglas Wilson, Lake Forest, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/573,062

(22) Filed: May 17, 2000

(51) Int. Cl.[7] .................................................. G06F 11/00
(52) U.S. Cl. ........................... 714/15; 714/20; 707/202; 707/204
(58) Field of Search .......................... 714/15, 20, 49; 707/202, 204

(56) References Cited

U.S. PATENT DOCUMENTS

| | | | | |
|---|---|---|---|---|
| 5,958,062 A | * | 9/1999 | Komasaka et al. ............ | 714/1 |
| 6,092,213 A | * | 7/2000 | Lennie et al. ................. | 714/3 |
| 6,173,417 B1 | * | 1/2001 | Merrill ......................... | 714/15 |
| 6,324,654 B1 | * | 11/2001 | Wahl et al. .................... | 714/6 |
| 6,363,498 B1 | * | 3/2002 | Howell ......................... | 714/15 |
| 6,397,381 B1 | * | 5/2002 | Delo et al. .................... | 717/174 |
| 6,438,749 B1 | * | 8/2002 | Chamberlain ................. | 717/174 |
| 6,496,944 B1 | * | 12/2002 | Hsiao et al. ................... | 714/15 |

OTHER PUBLICATIONS www.estools,unisys.com/docs/ProgrammingGuide.pdf. Aug. 2002, pp. 9–109—9–119.*
Robichaux, Paul. Managing the Windows NT Registry.Apr. 1998.O'Reilly & Associates. pp. 66–92, 115–116.*

* cited by examiner

Primary Examiner—Robert Beausoliel
Assistant Examiner—Yolanda L. Wilson
(74) Attorney, Agent, or Firm—Alfred W. Kozak; Mark T. Starr; Lise A. Rode

(57) ABSTRACT

In a system where a remote backup platform is enabled to automatically duplicate each registry key change in a local platform, a method is provided wherein restoration of original remote registry key data can be accomplished by utilizing a remote disk file which stores original data. When local original registry data on the local platform is lost to due breakdown, then a restoration program can access the backup remote registry key data for conveyance to the local registry key.

6 Claims, 9 Drawing Sheets

FLOW CHART FOR START MONITOR

FLOW CHART OF REGISTERMONITOREDKEY

FLOW CHART OF STOP MONITOR

FLOWCHART FOR RESTOREREMOTEKEY

FLOWCHART FOR RESTOREKEYFROMBACKUP

METHOD FOR RECOVERY OF ORIGINAL REGISTRY KEY FILE DATA

CROSS-REFERENCES TO RELATED APPLICATIONS

This application is related to a co-pending application entitled "System and Method for Replicating Monitored Registry Keys", U.S. Ser. No. 09/573,063, filed May 17, 2000, and which is incorporated herein by reference.

FIELD OF THE INVENTION

This invention relates to the recovery of original registry key data after providing synchronization and duplication of registry information as between a local platform and its facilities and a remote platform and its facilities.

BACKGROUND OF THE INVENTION

In database management, there is the concept of a "key" which is an identifier for a record or group of records in a data file, most often the key is defined as the contents of a single field called the "key field" in some database management programs and called "the index field" in others. In most database management systems, the keys (meaning the contents of a single key field or the composite key) are maintained in key tables which are specially indexed to speed record retrieval. In many database management systems, these key tables are called index files.

A key field is a field in a record structure or an attribute of a relational table that has been designated to be part of a key. A field can be keyed (or indexed) to improve or simplify the performance of retrieval and/or to update operations.

A key word is a characteristic word, phrase or code that is stored in a key field and used to conduct sorting or searching operations on records. This also applies to any of the dozens of words (also known as reserved words) that compose a given programming language or a set of operating system routines.

There is a factor called the "key word-in-context" which describes an automatic search methodology that creates indexes of document text or titles. Each key word is stored in the resulting index along with some surrounding text, usually the word or phrase that proceeds or follows the key word in the text or title.

In present day networks, there is a common configuration used in order to provide a local platform with facilities connected through a local area network over to a remote platform and remote facilities. The remote platform, and facilities are generally used as a backup system should the local platform and facilities fail. In such a case, then the operations are transferred to the remote platform and facilities in order that operations may be carried on. However, it is necessary that the remote platform and facilities be in synchronism or have data duplication of the local platform and facilities so that proper operations can occur without using invalid stale data or using data that is no longer correct.

In Windows Operating Systems there is a database designated as the Registry. This Registry database holds all varieties of information from system configurations to performance data to data about the applications available for use in the NT platform. This Registry is kept as a secured file on disk and a typical Registry is illustrated in FIG. 2. The Registry can also be held in memory in addition to the disk file. Each item in the Registry is designated as a Registry Key.

In the earlier practice, in these situations involving a local platform and a remote backup platform, it was necessary for the user or operator to specifically provide for manually backing-up the Registry keys so that the remote platform would be updated with the present information residing in the local platform. These backup situations often required that certain periods of time, say during the night, or other times, could be used to transfer the data from the local program to the backup program when the time was available. However, this took considerable periods of time and effort to accomplish and there was always certain periods wherein there was no synchronization or duplication between the remote platform and the local platform.

The present invention eliminates the need to manually backup Registry keys. By scripting the object, which is the Component Object Model (COM) involved, one can automate the whole process with minimum operator effort and time consumption so that the remote platform will always hold the most up-to-date information. Thus, any applications that keep their settings and other vital information in the local Registry of the local platform can easily make themselves suitable for a fail-over strategy without worrying how the registry data are replicated and maintained in the remote standby platform. The remote backup registry key data in the remote platform ensures the continuing protection of any registry key data lost on the source local platform.

Now, however, another problem situation often arises when the system operator wishes to recover various data items. For example, the operator may wish to recover the original registry key data the existed at the remote destination backup platform before that particular remote registry key data was changed during operation of the automatic update component between the local and remote platforms.

And again, further, the operator may wish to recover and reconstitute the original local registry key at the local platform after some local platform fault or shutdown. To do this, there is then required an operation to access the corresponding remote registry key and transport the key data back to the local platform for restoration.

The methods for accomplishing these restoration operations are taught herein with references to FIGS. 8 and 9.

SUMMARY OF THE INVENTION

The present invention introduces a Component Object Model (COM) component that monitors a user-specified Registry on the local computer platform by duplicating the Registry keys over to a remote machine platform and instantly updating it whenever the monitored local key (including its values and subkeys) is modified.

A mechanism and method is provided (exposed through a COM object) to backup a specific Registry key from a local computer to a remote computer in order to synchronize the data involved upon the occurrence of any changes.

Most Windows applications today make use of the Registry in various different ways, and it is possible to use the described COM object to provide backup so that the remote or destination platform will always store a duplicate copy of the local registry key and be available should any problem occur within the local source platform.

It is often the case that the system operator needs to restore the remote original registry key data to replace the updated changed remote registry key data This is accomplished by storing the "original" remote registry key data on a remote disk file which can later be retrieved. On the other after a failure in the local platform, the operator will want to access original registry key data from the remote platform and convey it to the local platform to restore a particular local registry key. A special program using a remote backup subkey allows this restoration to be accomplished.

GLOSSARY LIST

Figure 1:
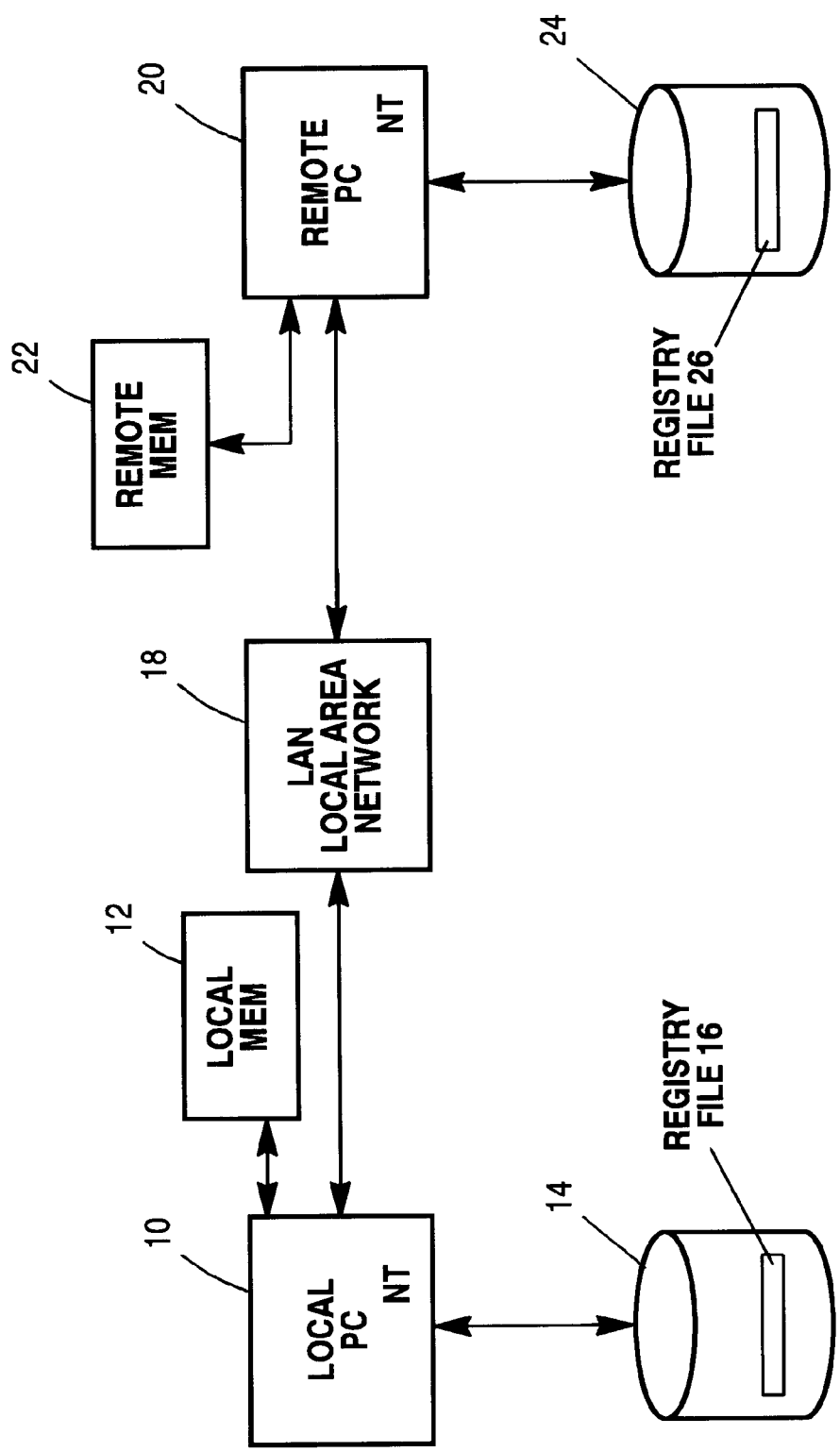
FIG. 1 is an overall environmental drawing show the relationship between a local computer platform and a remote computer platform connected through a local area network.

MONITORING COMPONENT: This is a scriptable component that monitors a specified Registry key on a local computer by duplicating this key to a remote machine and instantly updating the remote machine whenever the monitored local key (including its values and subkeys) is modified.

LOCAL MACHINE/COMPUTER: This is the computer where this component is installed and where the components' objects are run.

REMOTE MACHINE/COMPUTER: This involves any other connecting computer where the component stores a copy of its monitored local Registry key.

MONITORED/SOURCE REGISTRY KEY: This is the local machine's Registry key that is being monitored by an object of the component.

DESTINATION/BACKUP REGISTRY KEY: This is a copy of the local machine's monitored Registry key for the remote computer.

KEY: This involves data that identifies a record. Account number, product code and customer name are typical key fields used to identify a record in a file or data base. As an identifier, each key value must be unique in each record. A key field is a field in a record structure or an attribute of a relational table that has been designated to be part of a key. A field can be keyed (or indexed) to improve or simplify the performance of retrieval and/or to update operations.

HKEY: An abbreviation for the term "hive key". The word "hive" is used to denote each part of the Windows Registry.

REGISTRY KEY: In Windows NT platform, there is a central hierarchical database designated as Registry. It is used to store information necessary to configure the involved system and its applications. Each node in the registry is called key. A key can contain other sub-keys and values. There are six main parent keys in the registry: HKEY_PERFORMANCE_DATA, HKEY_CURRENT_CONFIG, HKEY_CURRENT_USER, HKEY_CLASSES_ROOT, HKEY_LOCAL_MACHINE, and HKEY_USERS. The component described in this invention only makes use of the last two keys.

LOCAL KEY: A key in the Registry of the local computer platform of the NT operating system.

REMOTE RACKUP KEY: A key in the Registry of the remote backup platform of an NT Operating System.

SUBKEY: Any registry key that is a child key of another key.

KEY NODE: Each key in the registry has a specific position within the registry's hierarchical order. Such a position is denoted as a key node.

MONITORED KEY: The registry key which is being monitored for any changes.

KEY CONFLICTS: A situation in which a monitoring object attempts to monitor a sub-key or a parent key or even the very same key of a key that is currently being monitored by another monitoring object.

CONNECTIONS SUBKEY: Registry keys used internally by the monitoring component to keep track of remote connections that it makes.

AUTOMATIC UPDATE (REMOTE BACKUP KEY): A process used by a registry-key-monitoring object to automatically update the remote backup key whenever the monitored local key is changed.

DATA OF MONITORED KEY: All sub-keys and values under the monitored registry key node in the registry.

SOURCE KEY: Same as MONITORED KEY

DESTINATION KEY: A corresponding key on a remote system for the monitored key on the local machine. The monitoring object ensures data between those two keys are synchronized.

OBJECT: A software program written in an object-oriented manner which exposes data and functions to operate on data.

COMPONENT OBJECT MODEL (COM): An open architecture for cross-platform developments of client/server applications and is based on, object-oriented technologies.

REGISTRY MONITORING COMPONENT: This is a component that monitors a user-specified registry on a local computer by duplicating the key to a remote machine and instantly updating it whenever the monitored local key (including its values and subkeys) is modified SCRIPTING THE OBJECT: An object can be scripted when it has been designed and implemented in a way that allows scripting languages to access its methods and properties. Scripting the object consists of using the object to perform tasks on behalf of scripts.

SCRIPT: A program written in a special-purpose programming language such as used in a communications program or word processor. This correlates to the term called "MACRO".

SCRIPTABLE COMPONENT: A COM component, such as the one described in this invention, that exposes objects and interfaces that can be utilized by scripting languages such as VB script and Java script. The "script" is a type of program that consists of a set of instructions to an application or utility program. A script usually consists of instructions expressed using the application's or utilities' rules and syntax, combined with simple control structures such as loops and "if/then" expressions.

MACRO: In applications, these involve a set of keystrokes and instructions recorded and saved under a short key name or macro name. When the key code is typed or the macro name is used, the program carries out the instructions of the macro. Program users create macros to save time by replacing often-used sometimes lengthy, series of strokes with shorter versions. Doing this eliminates frequent retyping, minimizes inadvertent typing errors, and enables users who are unfamiliar with a program to play back sets of instructions pre-recorded by someone more adept with the application. If the application also includes a macro language that responds to variables and conditional statements, the user can also control the outcome of a procedure by having the macro respond differently under different conditions. In programming languages, such as "C" or assembly language, the macro is a name that defines a set of instructions that are substituted for the macro name wherever the name appears in a program (a process called micro-expansion) when the program is compiled or assembled. Macro instructions can be placed either in the program itself or in a separate file that is identified in the program. Macros are similar to "functions" in that they can take arguments, and in that they are called to lengthier sets of instructions. Unlike "functions" macros are replaced by the actual instructions they represent when the program is prepared for execution. Function instructions are copied into a program only once.

FUNCTION: This is the purpose of or the action carried out by a program or routine. This is also a general term for a sub-routine. In some languages, this involves a sub-routine that returns a single value.

MONITORING A KEY: The process of observing a key to see if it changes.

MONITORING OBJECT: The object performing any monitoring.

ENUMERATION OBJECT: An object whose purpose is to provide an enumeration of a collection. When an object wishes to provide clients with a list of items, it often creates an enumeration object to maintain the list and supply each item in a specific order.

COMPONENT: In software terms, this usually means the same as Object.

REGISTRY MONITORING COMPONENT FEATURES: The component features the following:
  (i) Synchronization of both source and destination keys' data.
  (ii) Backup protection of the destination key.
  (iii) Redirection of destination key: The name of the destination key can be different from the name of the source key.
  (iv) Restoration of the overwritten destination key: When replicating the source key to the destination key and the latter already exists, the monitoring object will save the original destination key before overwriting it. This action allows the object to be able to restore the destination key with the saved original data when requested.
  (v) Restoration of the monitored key: The monitored key can be restored with data of a corresponding remote key.
  (vi) Enumeration object to enumerate all monitored Registry keys on the local machine.

NT IN DOMAIN: An NT domain is an identifiable group of network computers with at least one of the computers serving as a primary domain controller.

BACKUP PROTECTION: The notion that data is protected because it has been "backed-up" somewhere, so a copy is available in case the original is destroyed, corrupted or lost.

FAILOVER ENVIRONMENT: This is a configuration where a remote computer serves as a stand-by unit for the local computer machine in case the local machine fails.

ADMINISTRATOR GROUP: The security group to which users belong if they have Administrator privilege, the privilege to alter normally secure configurations on a computer.

SYSTEM PRE-DEFINED/RESERVED KEY: This is a class of keys which are designated as the HKEY_XXXXXXX in the Windows operating system.

DESTINATION/BACKUP REGISTRY KEY: This key provides a copy of the local machine's monitored Registry key on a remote computer.

CLIENT: This is a script or a program that requests service of the component.

HKEY CLASSES ROOT: The section of the Windows registry containing information about the classes (object repositories) on the computer.

HKEY CURRENT CONFIG: The section of the Windows registry containing information about the current configuration of the computer.

HKEY CURRENT USER: The section of the Windows registry containing information about the settings, configuration and options of the currently logged-in user.

HKEY LOCAL MACHINE: The section of the Windows registry containing information about the settings and options of the computer which are independent from those used by the currently logged-in user.

HKEY USERS: The section of the Windows registry containing information about each user that has been logged-in to the computer. When one of these users logs in, the part relevant to that user becomes equivalent to the HKEY_CURRENT_USER section.

HKEY PERFORMANCE DATA: The section of the Windows registry containing performance information about the computer.

MTA THREADING MODEL: A COM threading model that supports multi-threaded apartments (MTA). In COM, an apartment determines how an object's interfaces are passed and used by its clients.

MAIN THREAD: The primary thread of the registry monitoring component. Clients only interface with this thread through the component's supported methods and properties.

WORKER THREAD: A thread created by the main thread just for the sole purpose of monitoring the specified registry key. It relieves the main thread from the monitoring responsibility, allowing the main thread to focus only on client requests.

START MONITOR: A method supplied by the component to start the monitoring process on a specified local key.

STOP MONITOR: A method supplied by the component to stop the monitoring process on a specified local key.

REGISTRY MONITORING OBJECT: See REGISTRY MONITORING COMPONENT.

BACKUP DISK FILE: This is a disk file at the remote location which contains the original data of the destination key.

EVENT NOTIFICATION: This is where the component supports an event firing mechanism if an error occurs or the monitored key is changed during the monitoring process.

STANDBY SYSTEM: A backup computer for another computer in a fail-over environment. If the main computer fails, the standby system will take over.

VISUAL BASIC ITERATION: The Visual Basic (VB) computer language has syntax to iterate through a collection of items being managed by an object. This iteration (sometimes called enumeration) is often supplied by an enumeration object.

MONITORING PROCESS: The process on the computer which has instantiated a monitoring object.

RegistryKey: This is a property of the Component which sets or returns the local registry key to be monitored. The set value cannot be null and is required. However, only keys under HKEY_LOCAL_MACHINE and HKEY_USERS are allowed.

RemServer: This is a property of a Component which sets or returns the remote computer's name. A set value cannot be null and is required. It cannot be changed while the monitoring is in progress.

RemUsername: This is a property of the Component which sets or returns the remote logon user name. The component only uses this information to connect the remote machine after it cannot establish the connection using the default user name associated with the running process.

RemPassword: This is a Component property which sets the remote logon password. The component only uses this information to connect to the remote machine after it cannot establish the connection using the default password associated with the running process.

RemLogonDialog: This is a property of the Component which sets or returns the remote logon dialog indicator. If the indicator is "true", the client will receive a logon dialog at the connection time.

RemBackupSubkey: This is a property of the Component which sets or returns the remote backup Registry key name. If the set value is null, a backup key identical to the monitored key will be created; otherwise a copy of the monitored key will be created under the specified backup key name. Since the component requires the RemBackupSubkey value to point to the same system pre-defined key node as dictated by the Registry key property, the string for the predefined key can be omitted.

MonitorAllowed: This is a property of the Component which returns a value indicating whether the key-specified via the Registry key property can be monitored. A key is allowed to be monitored if it is not: (i) currently being monitored; (ii) a parent key of any key currently being monitored; (iii) a child key (subkey) of any key currently being monitored.

RestoreRemoteKey: This is a method which restores the overwritten remote Registry key from the back-up disk file created by the start monitor. The monitoring process must be stopped before calling this method.

RestoreKeyFromBackup: This is a method which restores the monitored key indicated by the Registry key property with the data of the remote backup key indicated by the REMBACKUPSUBKEY property. The monitoring process must be stopped before calling this method for execution.

OnMonitorError: This is an event handling method which will get called when any error occurs during the monitoring process. The method is passed with an error object where the error object is the pointer to the monitor error object which has two properties which are (i) ERR—which returns the WIN 32 error code, and (ii) the DESCRIPTION—which returns a string describing the error.

OnRegistryChange: This is an event handling method which will get called when there are changes affecting the monitored key.

DESCRIPTION OF PREFERRED EMBODIMENT

FIG. 1 is an illustrative diagram showing the various elements involved in a local and remote platform. A local computer. 10 utilizing the NT operating system is connected to a disk storage unit 14 having a Registry file 16. The local computer 10 has a local memory 12 and the local computer 10 is connected to a local area network (LAN 18). The local area network provides for transmission of data and information between the local platform 10 and the remote platform 20, which is also an NT operating system. The remote platform 20 has a remote memory 22 and is also connected to a remote disk unit 24 which has a Registry file 26.

The object of the monitoring component is to ensure that any monitored Registry key in the Registry file 16 on the disk unit 14 of the local platform 10 will be duplicated and synchronized at the disk unit 24 of the remote platform 20, such that the corresponding destination key in Registry file 26 will always be updated as a current duplicate of that in the registry file 16.

Figure 2:
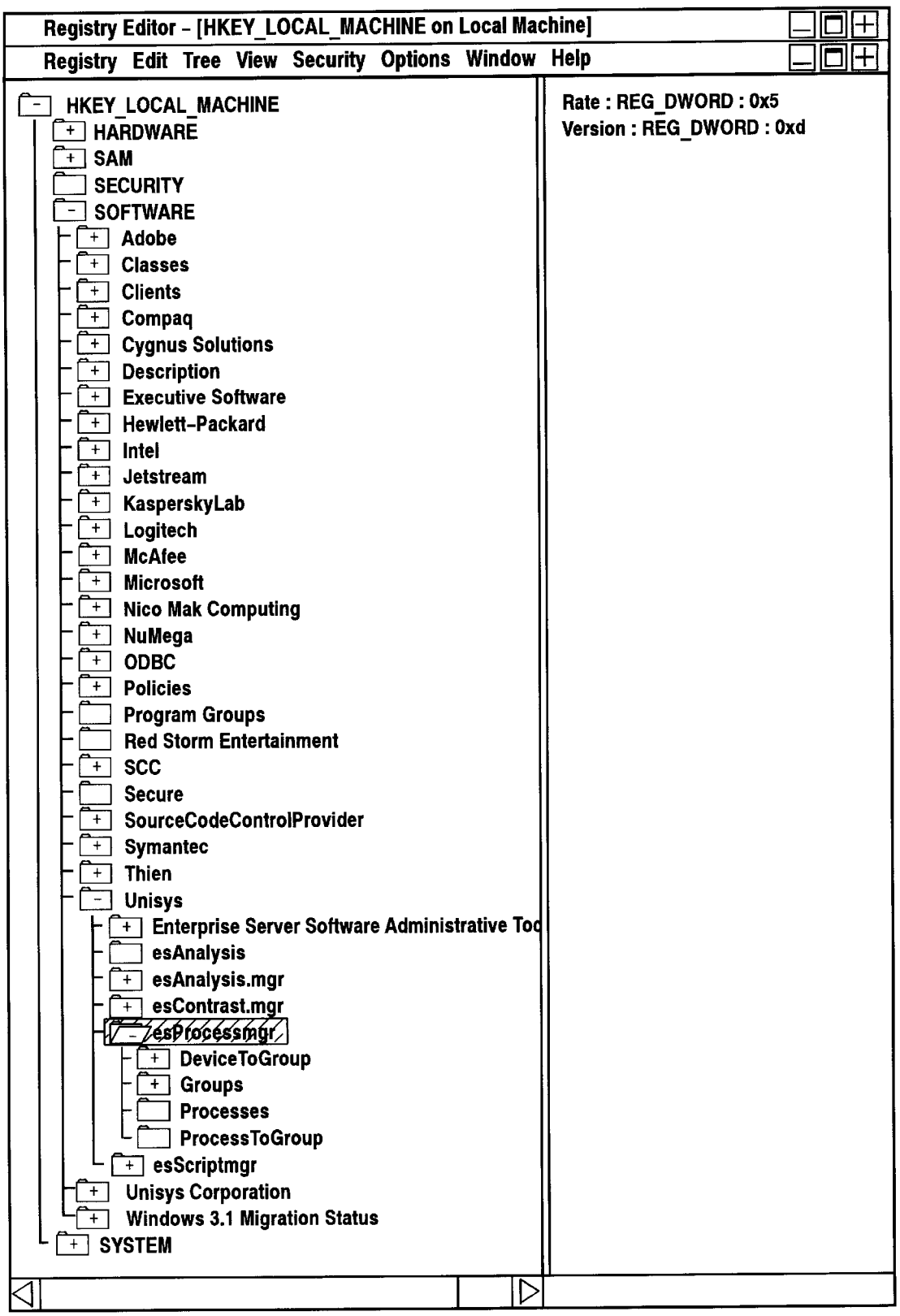
FIG. 2 is a sketch of a window which illustrates the Registry editor and shows the various categories of data which are on the local machine platform.

FIG. 2 is an illustrative example of a window of the Registry Editor application on the local computer platform. The Registry Editor is seen to show the window of the pre-defined key HKEY_LOCAL_MACHINE. Here, under the pre-defined key, there are other sub-keys such as HARDWARE, SAM (Security Account Manager), SECURITY and then SOFTWARE.

The SOFTWARE category is seen to have other sub-keys which are indicated as Adobe, Classes, Clients, Compaq, etc. Thus, the list of items shown under the headline "SOFTWARE" indicates a set of Registry keys which can be used, accessed and occasionally modified or changed. However, when any changes occur in these registry keys, it is important that the backup system be updated as soon as possible, preferably immediately, in order that the backup system will be synchronized in order to provide a duplicate of the current information in the local systems Registry.

Figure 3:
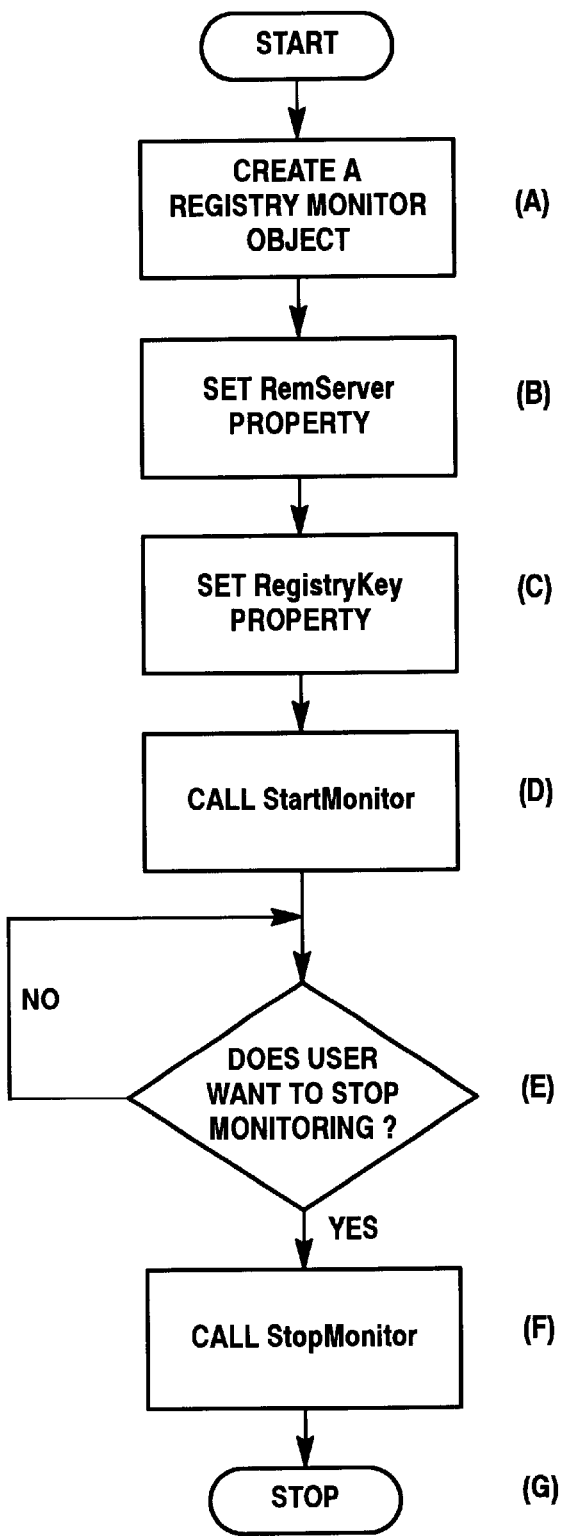
FIG. 3 is a flowchart which illustrates a simple way to initiate a Registry monitoring object and the handling of its events.

FIG. 3 is flowchart which is used for initiating a registry monitoring object and the subsequent handling of its events.

Initiating a Registry Monitoring Object and Handling of its Events: (FIG. 3)

Figure 4:
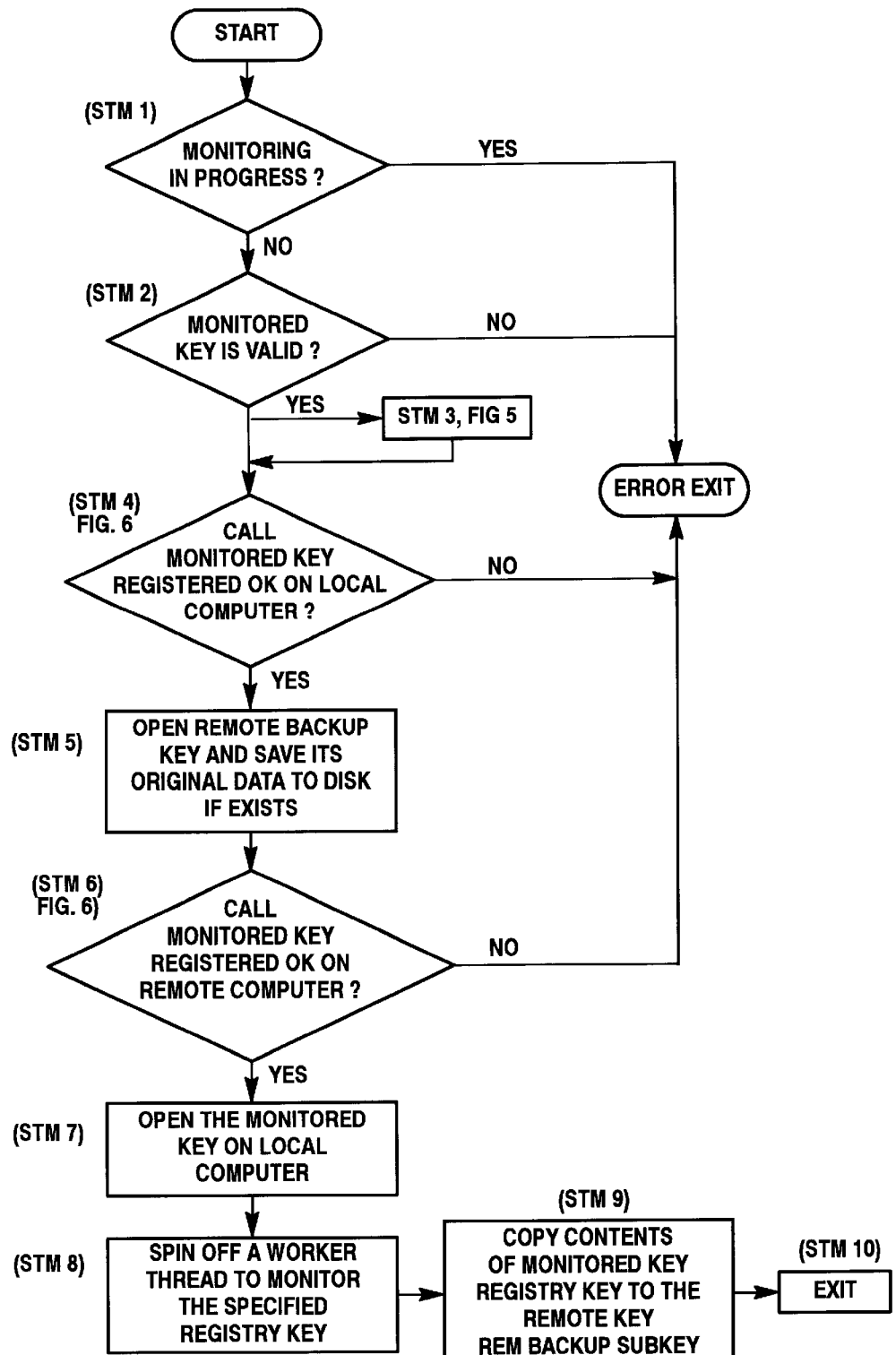
FIG. 4 is a flowchart illustrating the method StartMonitor which initiates a registry-key monitoring process.
Figure 7:
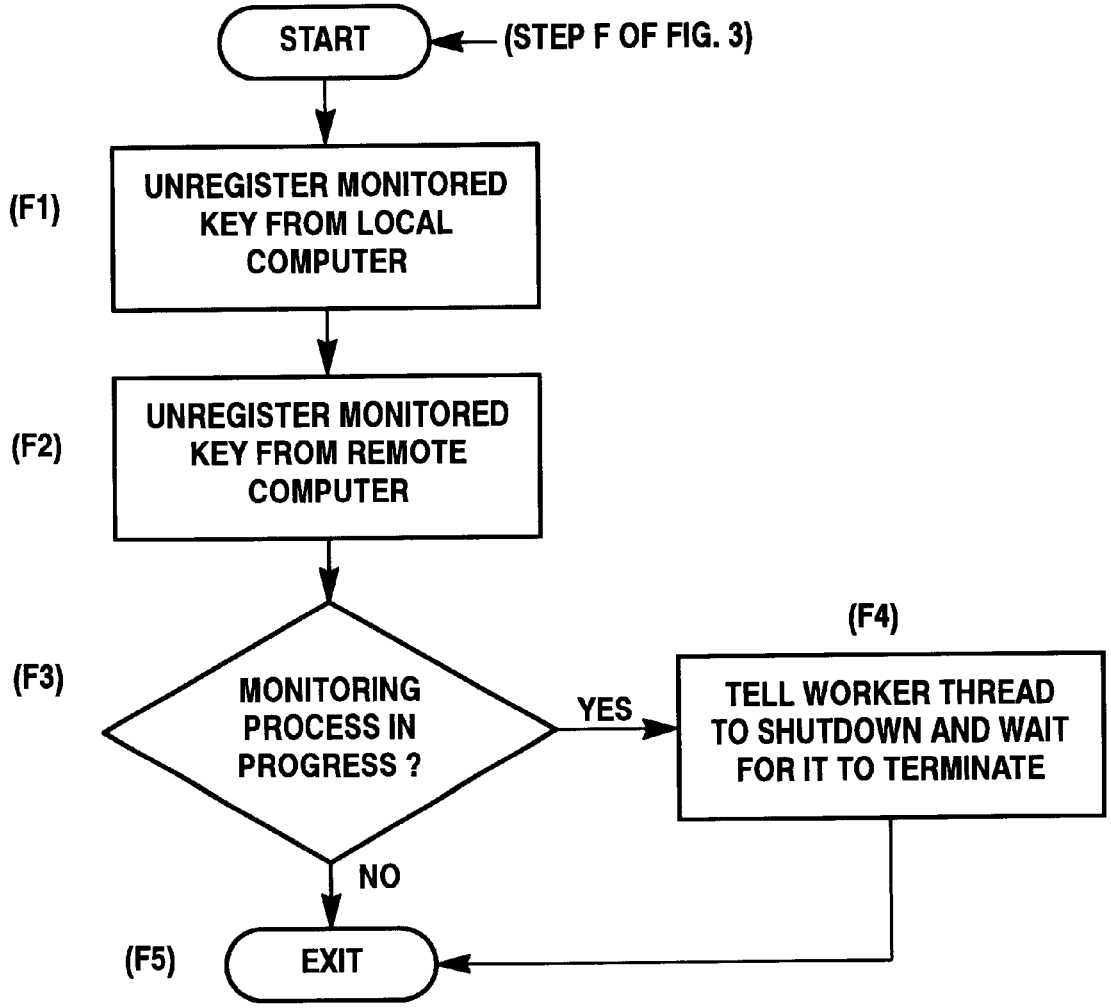
FIG. 7 is a flowchart for the method StopMonitor which stops the registry monitoring operation.

A. Create a Registry monitor object.
B. Set the remote server name (RemServer) where the duplicated destination key will be stored by assigning that name to the property Remserver of the monitor object.
C. Set the local Registry key to be monitored by assigning the key name to the property RegistryKey of the monitor object.
D. Initiate the monitoring process by invoking the method StartMonitor of the monitor object (as seen in FIG. 4).
E. Wait until the user indicates he wants to stop the monitoring process.
F. Stop the monitoring process by invoking the method StopMonitor of the monitor object (as seen in FIG. 7).
G. Release the registry monitor object.

FIG. 3 is a flow chart illustrating the initiation of a registry monitoring object and the handling of subsequent events.

At step A, there is first the creation of a registry monitor object. From a C++ program, this is achieved by calling the Win32 API CoCreateInstance passing the object's class identifier. From a VB script, it is as simple as calling CreateObject passing the name of the object's component. For example, a VB script to create a registry monitoring object would look something like this:

```
Dim RegMonObj
Set   RegMonObj=WScript.CreateObject
   ("Unisys.RegistryMonitor")
```

The next step B involves setting up the remote server name where the duplicated destination key will be stored. This is done by assigning the remote server name to the property designated RemServer of the monitor object created in step A. Continuing with the example above, the script could contain code like this:

```
RegMonObj.RemServer="RemoteComputerName"
```

At step C, the operator then sets the local registry key which is to be monitored by assigning the key name to the property RegistryKey of the monitor object. For example:

```
RegMonObj.RegistryKey=
   "HKLM\Software\Unisys\esProcessMgr"
```

At step D, the monitoring process is initiated by calling up the method designated as StartMonitor of the monitor object. For example:

```
RegMonObj.StartMonitor
```

At step E there is a decision block which asks the query as to whether the user wants to stop monitoring? If the answer is no, the sequence returns back and loops back upon itself. If the answer is yes, then at step F the user stops the monitoring process by invoking the method StopMonitor of the monitor object. A simple VB script could just display a button that a user could click to stop the monitoring process. For example:

```
MsgBox "Click OK to stop the registry monitoring
   object"
RegMonObj.StopMonitor
```

The Registry Monitoring Component

The registry monitoring component supports the following properties and methods:

Properties

RemServer: sets/returns the name of the remote computer where a copy of the monitored key will be stored.

RegistryKey: sets/returns the name of the registry key to be monitored on the local computer.

RemUsername: sets/returns the usercode that is valid on the remote computer.

RemPassword: sets the password associated with RemUsername.

MonitorAllowed: returns TRUE if the key specified by RegistryKey can be monitored; otherwise returns FALSE.

RemLogonDialog:; sets/returns a value that indicates whether the component will display a logon dialog box.

RemBackupSubkey: sets/returns a corresponding backup key on the remote computer for the monitored key specified by the property RegistryKey. When the monitoring process starts, the data of RegistryKey will be duplicated over to RemBackupSubkey. If the key specified by RemBackupSubkey already exists, its original data will be saved to disk before being overwritten with the data of RegistryKey. This makes it possible to restore RemBackupSubkey with its original data when needed by calling the method RestoreRemoteKey. If RemBackupSubkey is not specified, RemBackupSubkey will have the same name as RegistryKey.

Methods

StartMonitor: called to start the component's monitoring process.

StopMonitor: called to stop the component's monitoring process.

RestoreRemoteKey: called to restore the backup key specified by the property RemBackupSubkey with its original data. The monitoring process should have already been stopped before invoking this method.

RestoreKeyFromBackup: called to restore the data of the registry key RegistryKey with the contents of the remote key RemBackupSubkey. The monitoring process should have already been stopped before invoking this method.

Description of the Method Startmonitor (FIG. 4)

This step is shown at step D of FIG. 3 and is expanded here in FIG. 4.

STM1. Check if the monitoring is already in progress. If so, exit with error. If "No", then go to STM2.

STM2. Check if the registry key specified by the property RegistryKey is valid. If not, exit with error. If "Yes", go to STM3 (which is described in FIG. 5).

STM3. Call the internal method RemConnect (see "Description of the Method RemConnect" in FIG. 5) to make a connection to the remote server specified by the property RemServer. If RemConnect fails, exit with error.

STM4. Call the internal method RegisterMonitoredKey (see FIG. 6) to register the monitored key on the local machine. If RegisterMonitoredKey fails, exit with error. If Monitored key is registered O.K. (YES), then go to STM5.

STM5. Open the remote backup registry key specified by the property: RemBackupSubkey on the remote computer RemServer. If key does not exist, create it. If key already exists, save its original data to a registry disk file.

STM6. Call the internal method RegisterMonitoredKey (see FIG. 6) to register the monitored key on the remote machine. If RegisterMonitoredKey failed, exit with error. If registered O.K. (YES), then go to STM7.

STM7. Open the monitored key RegistryKey on the local computer.

STM8. Spin off a worker thread to start registry key monitoring process.

STM9. Copy the contents of the monitored key RegistryKey to the remote key RemBackupSubkey.

STM10. Exit the method.

The sole purpose of the monitor worker thread (at STMB) is to update the backup registry key RemBackupSubkey on the remote computer RemServer when there are any changes to the monitored key RegistryKey. This is accomplished so as to:

W1. Wait for either one of the two events to happen: Registry key change on the monitored key RegistryKey, or a shutdown notification from its parent (main) thread.

W2. If a registry change event occurs, copy the contents of the local monitored key RegistryKey to its backup key RemBackupSubkey on the remote computer RemServer. Once done, go back to waiting mode.

W3. If a shutdown event occurs, exit the thread.

Figure 5:
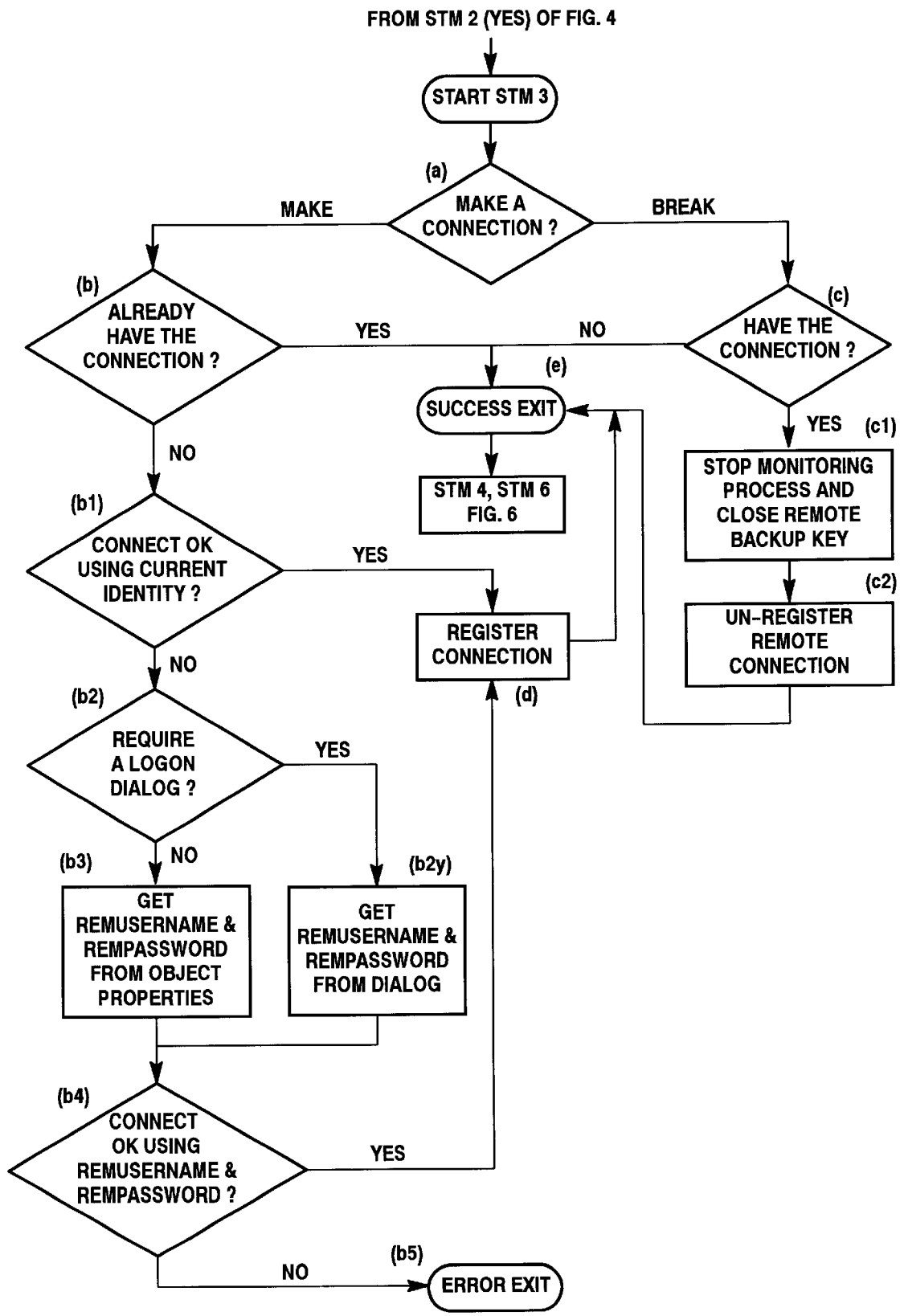
FIG. 5 is a flowchart illustrating the method RemConnect (called by StartMonitor) for interfacing to the remote platform.

Description of the Method Remconnect (FIG. 5)

Step (a) is a query to make (b) or to break (c) a connection:

I. If RemConnect is called to make a connection (step b):
   I1. Check if the local computer already has a connection with the remote computer RemServer. If "YES", exit the method at step e.
   I2. If not already having a connection (NO), then make a connection using the current identity of the running process at step b1. If successful, register the connection (step d) to a volatile registry key and exit the method (e).

I3. Check (step b2) if the property RemLogonDialog is set. If, "YES", at step b2y bring up a dialog box to get usercode and password from user. Attempt another connection with this usercode/password combination. If successful, at step b4, register the connection at step d to a volatile registry key and exit the method. If failed, exit with error at step b5.

I4. If step b2 is "NO", then make another attempt to connect to the remote machine RemServer with the specified properties RemUsername and RemPassword. If successful, (YES) register the connection at step d to a volatile registry key and exit the method at (e). If failed, exit with error at b5.

II. If RemConnect (at step (a) of FIG. 5) is called to break a connection:

Check at step (c) if there is still the connection. If "YES", stop any monitoring process this object currently has and close the remote key RemBackupsubkey, as shown at step (c1).

Un-register the connection from a volatile registry key, at step (c2) and then exit at step (e).

Figure 6:
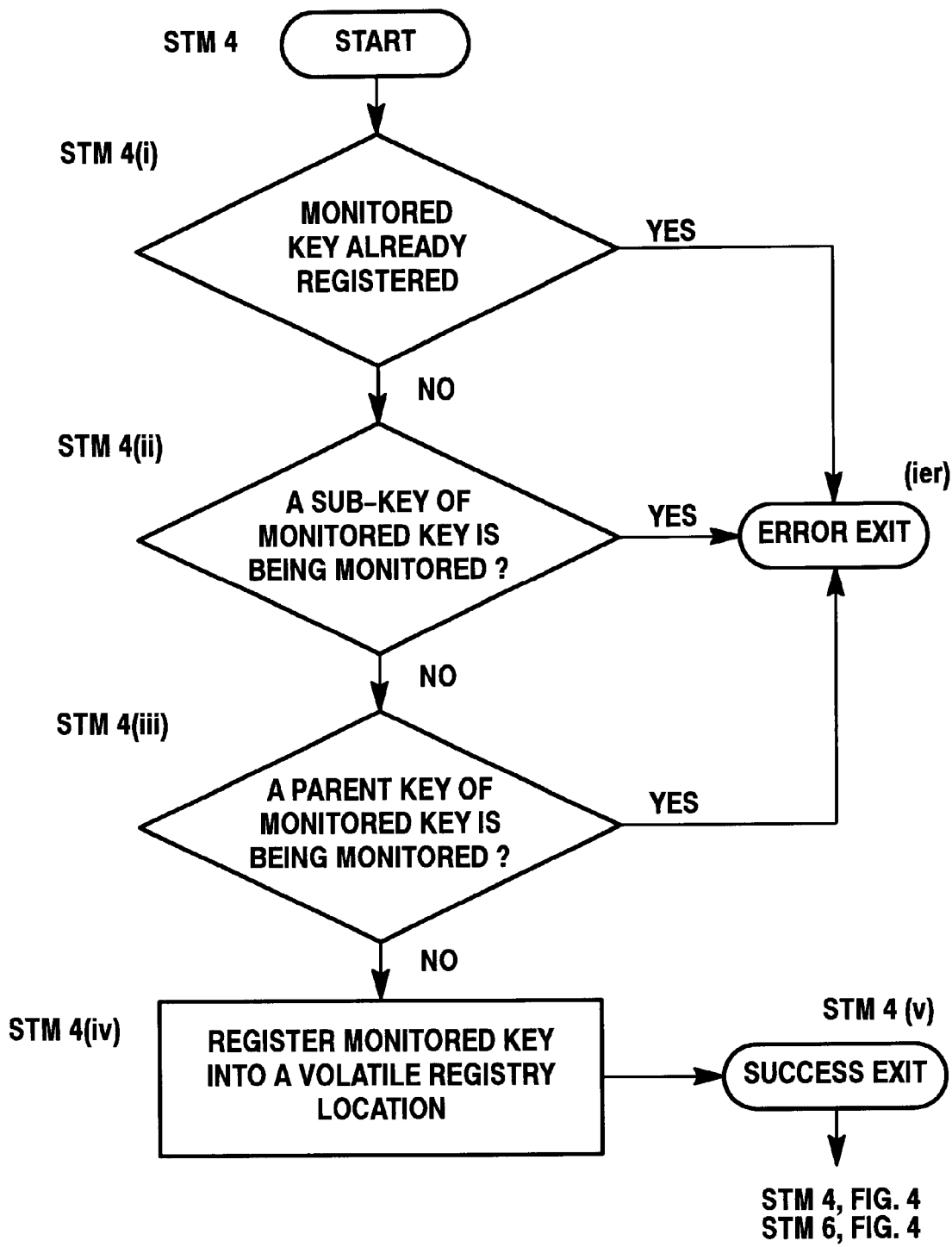
FIG. 6 is a flowchart illustrating the method RegisterMonitoredKey which registers the specified registry key to the monitoring component.

Description of the Method Registermonitoredkey (FIG. 6)

The method RegisterMonitoredKey is passed with the parameter bRemote to indicate whether the registration is done on the local computer or on the remote computer. Its main responsibility is to ensure that the monitored key is not already being monitored by another object running on either the local machine or remote machine. This method includes the following steps:

STM4(i) Check if the monitored key RegistryKey is already registered. If YES, it means that another object already monitors the key. Exit the method with error at (ier).

STM4(ii) Check if any sub-key of the monitored key RegistryKey is currently being monitored by another object. If YES, exit with error at (ier).

STM4(iii) Check if any parent key of the monitored key Registry Key is currently being monitored by another object. If YES, exit with error at (ier). If NO, go to step STM(iv).

STM4(iv) Register the monitored key RegistryKey by storing its name into a known volatile registry location.

STM(v) Exit with a successful code.

Description of the Method Stopmonitor (FIG. 7)

The StopMonitor sequence (of step F of FIG. 3) involves the following steps:

F1. Un-register the monitored key RegistryKey from the local computer by removing its entry from the known volatile registry location described in step STM4(iv) of FIG. 6.

F2. Un-register the monitored key RegistryKey from the remote computer by removing its entry from the known volatile registry location described in step STM4(iv) of FIG. 6.

F3. If the monitoring process is currently in progress, (YES) send a shutdown notification to the monitor worker thread (as described in FIG. 4, step STM8).

F4. Wait for the worker thread to exit.

F5. Exit the method.

RECOVERY OF OVERWRITTEN REMOTE KEYS: Any time a monitoring object is about to overwrite an existing remote key, it will create a backup Registry file for that key under the remote machine's system directory before copying the data of the monitored key from the local machine to the remote machine.

For example, suppose the remote machine's system directory is C:\WINNT\System32 and the monitored key on the local computer is HKLM\Software\Unisys\esProcess. Also suppose that the remote computer already contains a key called HKLM\Software\Unisys\esProcess in its Registry. Before overwriting the key HKLM\SOFTWARE\UNISYS\esProcess on the remote system with data of the same key from the local machine, the monitoring object will create the following disk file to contain the original data of the involved remote key:

C:\WINNT\System32\UnisysRegMon\HKLM\Software\Unisys\esProcess_<Date>_<Time>

PROGRAMMATIC RECOVERY: As long as the monitoring object, which creates the backup disk file for the remote destination key, still exists, restoring the original data of the remote destination key is as simple as calling its method RestoreRemoteKey, shown in FIG. 8.

Manual Recovery

When it is not possible to restore the original data of the remote destination key (e.g., the monitoring object is no longer around), a manual recovery can be achieved using the system-provided utility called RegEdt32.exe.

For restoration of the remote key, the following process is involved:

Run Regedt32.exe on the remote machine

Select the involved key node (or create it if it doesn't exist and then select it).

Using the example above, the key node HKLM\SOFTWARE\UNISYS\esProcess should be selected.

Choose "restore" from the Registry menu.

Browse and select the appropriate backup Registry file. Then click on "open".

The warning "Registry editor will restore a key on top of the currently selected key. All value entries and subkeys of this key will be deleted. Do you want to continue the operation? - - - (This appears on the screen).

Click "OK" to go ahead with the operation. The remote key should now be restored.

Figure 8:
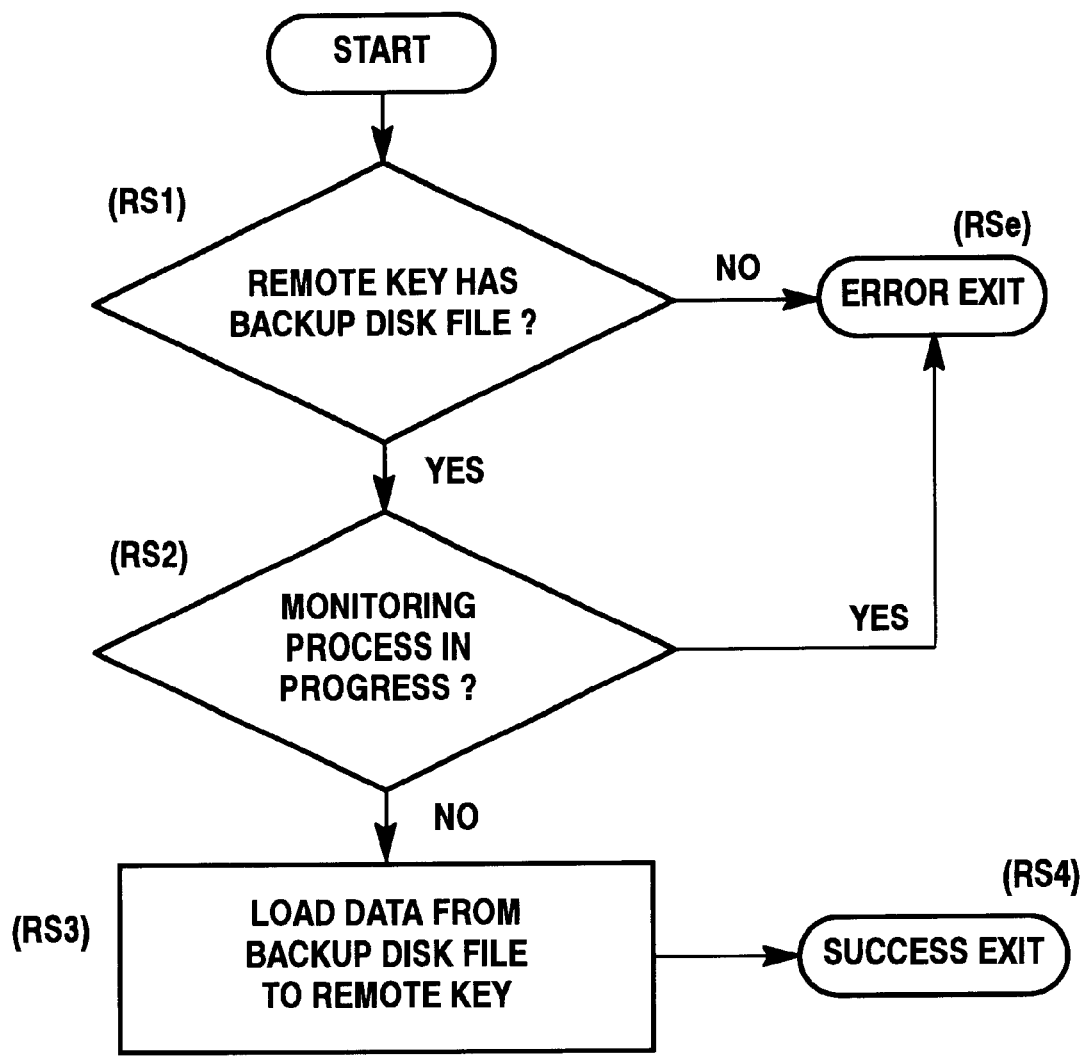
FIG. 8 is a flowchart illustrating the method RestoreRemoteKey which allows the original data of the remote key to be restored.

Description of the Method Restoreremotekey (FIG. 8)

The method for restoration of the original data to a remote key is seen in FIG. 8 and done as follows:

RS1. Check; if the object had previously created a registry file containing the original data of the backup key RemBackupSubkey on the remote machine Rem-Server. If (NO), exit with error at Rse. If YES, go to RS2.

RS2. Check if the monitoring process is currently in progress. If YES, exit with error. If NO, go to RS3.

RS3. Call a Win32 API to load the saved registry file into the key RemBackupSubkey.

RS4. Exit the method.

Suppose a user wanted to monitor a registry key called "HKLM\Software\Unisys\esProcess" on the local computer A and had already specified a remote computer called computer B. By default, when the monitor object starts, it will create an identical key with the same name "HKLM\Software\Unisys\esProcess" on computer B. If computer B happens to already have an existing key called "HKLM\Software\Unisys\esProcess", the data of this key will be written to a disk file, say, for the sake of discussion, file "SAVEDKEY", before being overwritten by computer A's "HKLM\Software\Unisys\esProcess" key.

The method RestoreRemoteKey of FIG. 8 basically describes the process of loading the data in file "SAVED-KEY" back into the key "HKLM\Software\Unisys\esProcess" of computer B, thus, restoring the original data of the said key on B.

Figure 9:
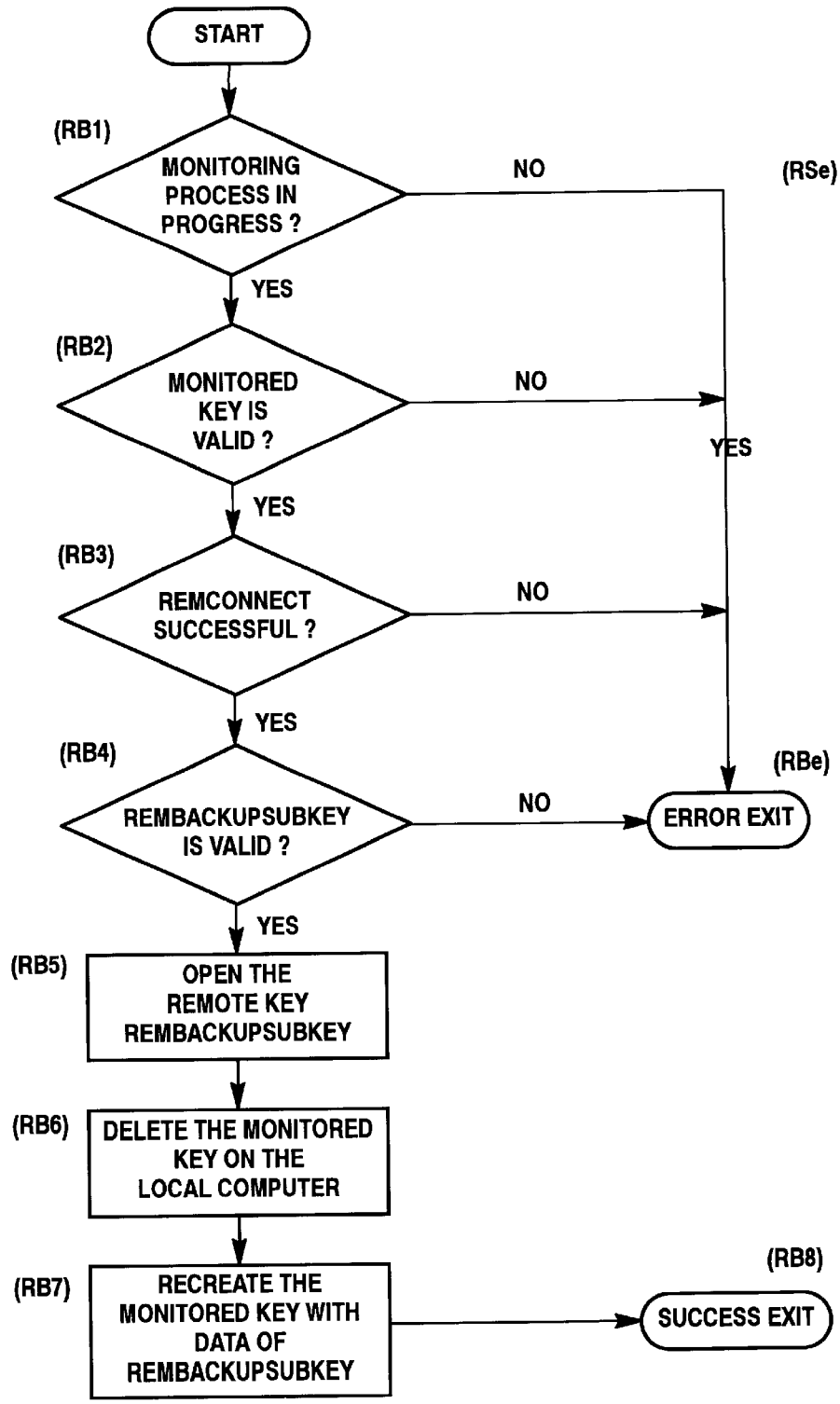
FIG. 9 is a flowchart illustrating the method RestoreKeyFromBackup which allows the contents of monitored registry key on the local computer to be replaced with the data of its corresponding remote registry key.

On the other hand, the method RestoreKeyFromBackup of FIG. 9 describes the operation of copying the current data of the key "HKLM\Software\unisys\esProcess" on computer B back onto the key "HKLM\Software\Unisys\esProcess" of computer A.

Sometimes users may not want the monitoring object to trample over the existing key "HKLM\Software\Unisys\esProcess" on computer B. In that case, they can re-direct the destination (i.e., remote key) to another name by using the property RemBackupSubkey of the monitoring object. Assume that they have specified RemBackupSubkey to "HKLM\Software\MyOwnKey", when the monitoring object starts, it will create the key "HKLM\Software\MyOwnKey\HKLM\Software\Unisys\esProcess" on computer B by concatenating the values of the properties RemBackupSubkey and RegistryKey. In this particular instance, if computer B has the key called "HKLM\Software\Unisys\esProcess", it will remain untouched.

If the method RestoreKeyFromBackup is invoked, the data of the key "HKLM\Software\MyOwnKey\HKLM\Software\Unisys\esProcess" (instead of "HKLM\Software\Unisys\esProcess") on computer B will get copied onto the key "HKLM\Software\Unisys\esProcess" of computer A.

Description of the Method Restorekeyfrombackup (FIG. 9)

The following steps are involved for restoring a local key from Backup files of the remote key:

RB1. Check if the monitoring process is currently in progress. If NO, exit with error at RBe. If YES, proceed to RB2.

RB2. Check if the monitored key RegistryKey is valid. If not, exit with error at RBe. If YES, go to RB3.

RB3. Call the internal method RemConnect (see FIG. 5) to make a connection to the remote server specified by the property RemServer. If RemConnect fails, exit with error at RBe. If the connection succeeds (YES) then proceed to RB4.

RB4. Ensure the property RemBackupSubkey is valid, (YES) to ensure that it still stores the pre-updated remote key file information.

RB5. Open the remote registry key RemBackupsubkey on the remote computer RemServer, and proceed to RB6.

RB6. Delete the monitored local key RegistryKey with all of its sub-keys and values.

RB7. Recreate the monitored local key RegistryKey with the data of the remote key RemBackupSubkey.

RB8. Exit the method.

Described herein has been a system enabling the automatic duplication of registry key data by a remote platform from a local source platform and additionally the provision for restoration of the original registry key data of the remote platform. Additionally, when failure occurs in a local platform and the local registry keys must be restored, then the described method can recover the registry key data from the remote platform for replacement of original registry data back to the local platform.

It is understood that various types of other embodiments may accomplish similar results to the methodology described herein but which still utilize the concept of the invention described in the attached claims.

What is claimed is:

1. In a remote key registry updating system which is automatically triggered when a local registry key has been changed in a local platform which is connected to a remote platform having a backup disk file and duplicate remote registry keys, a method for restoring the original file data of said remote registry key comprising the steps of:

(a) checking to see if said remote registry key has a backup disk file;

(b) verifying that a monitoring operation of registry keys is no longer functioning;

(c) loading the original registry key data from said backup disk file to said remote registry key to restore the original remote registry key data.

2. The method of claim 1 wherein step (b) includes the step of:

(b1) returning to an error exit status if the registry key monitoring operation is still functioning.

3. In an automatic remote registry key updating system involving a local and remote computer platform and triggered when a local registry key has been monitored and changed, a method for restoring the original local registry key data to its original pre-updated status by accessing the pre-updated registry key data from the remote platform, comprising the steps of:

(a) checking to see that the local registry key monitoring operation is continuing to function;

(b) checking to see that the remotely monitored registry key is in a valid status;

(c) connecting the local and remote platforms;

(d) validating the presence of the original local registry key as it was before any changes residing in a location designated as RemBackupSubkey;

(e) deleting the existing monitored registry key on the local platform;

(f) re-creating the local monitored registry key with the data presented by the Remote Backup Subkey.

4. In an automatic updating system wherein a remote registry key is updated immediately when a local registry key is changed in content, a method for restoring the original remote registry key data which existed before the update operation, comprising the steps of:

(a) searching to find if the remote registry key has been stored in a remote backup disk file;

(b) verifying that the automatic monitoring action of registry keys is no longer functioning;

(c) loading the original remote registry key data as it existed before being changed, from said remote backup disk file over to the remote registry key thus to restore its original data.

5. The method of claim 4 wherein step (b) includes the step of:

(b1) if no verification occurs for non-functioning of the monitoring action, then exiting to an error signal.

6. In a network where a local computer platform is linked to a remote computer platform and said local platform provides an Object (Component) which automatically updates any remote registry key whenever a local registry key undergoes a change while being monitored, a system for restoring an updated remote registry key back to its original registry key data comprising:

(a) means to search a remote backup disk file to find the original registry key data that existed before the remote registry key update;

(b) means for establishing the condition that the ongoing monitoring operation is now disabled;

(c) means for loading the original registry pre-updated key data from said remote backup disk file to said remote registry key to restore the original remote registry key data.

\* \* \* \* \*